United States Patent [19]
Hergatt et al.

[11] 3,777,506
[45] Dec. 11, 1973

[54] PORTABLE AIR CONDITIONER APPARATUS

[75] Inventors: Robert N. Hergatt, Pavonia; Alvy M. Hazen, Mansfield; Joseph Priess, both of Mansfield, all of Ohio

[73] Assignee: Camper Comfort Corporation, Pavonia, Ohio

[22] Filed: May 8, 1972

[21] Appl. No.: 251,185

[52] U.S. Cl. ............... 62/237, 62/262, 62/298, 62/259, 62/448
[51] Int. Cl. ............................................ F25d 15/00
[58] Field of Search ................ 62/65, 237, 262, 62/448, 449, 298

[56] References Cited
UNITED STATES PATENTS

| | | | |
|---|---|---|---|
| 2,251,960 | 8/1941 | Smith | 62/262 |
| 2,293,360 | 8/1942 | Reilly | 62/237 |
| 2,716,870 | 9/1955 | Biehn | 62/234 |
| 2,778,206 | 1/1957 | Wilson | 62/237 |

FOREIGN PATENTS OR APPLICATIONS

1,084,327  7/1954  France .................................. 62/237

*Primary Examiner*—William J. Wye
*Attorney*—Donald L. Otto

[57] ABSTRACT

Portable air conditioner apparatus designed primarily for use with recreational vehicles includes an air conditioner unit having wheels for portability and a head adaptor assembly which is vertically adjustable with respect to the unit for alignment with a window in the vehicle. The head adaptor unit consists of an insulated pan communicating with the air conditioner unit through flexible hoses. The pan is sufficiently deep to receive jalousie windows or the like when open, and has a peripheral gasket about its open end for sealing contact with the vehicle. Leveling mechanisms may be provided on both the front and back of the air conditioning unit properly to position such unit and assembly with respect to the vehicle for effectuation of a tight seal.

16 Claims, 9 Drawing Figures

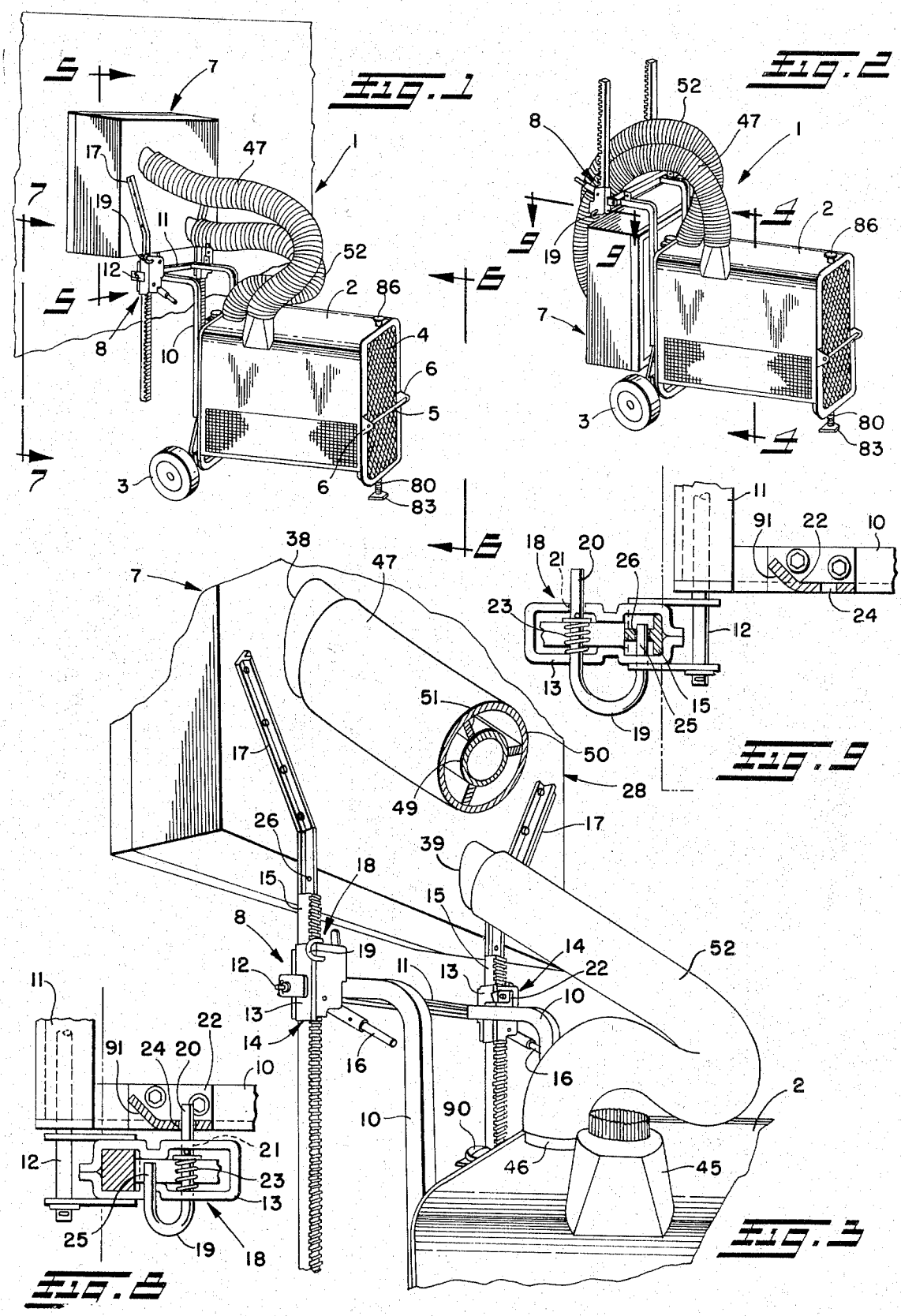

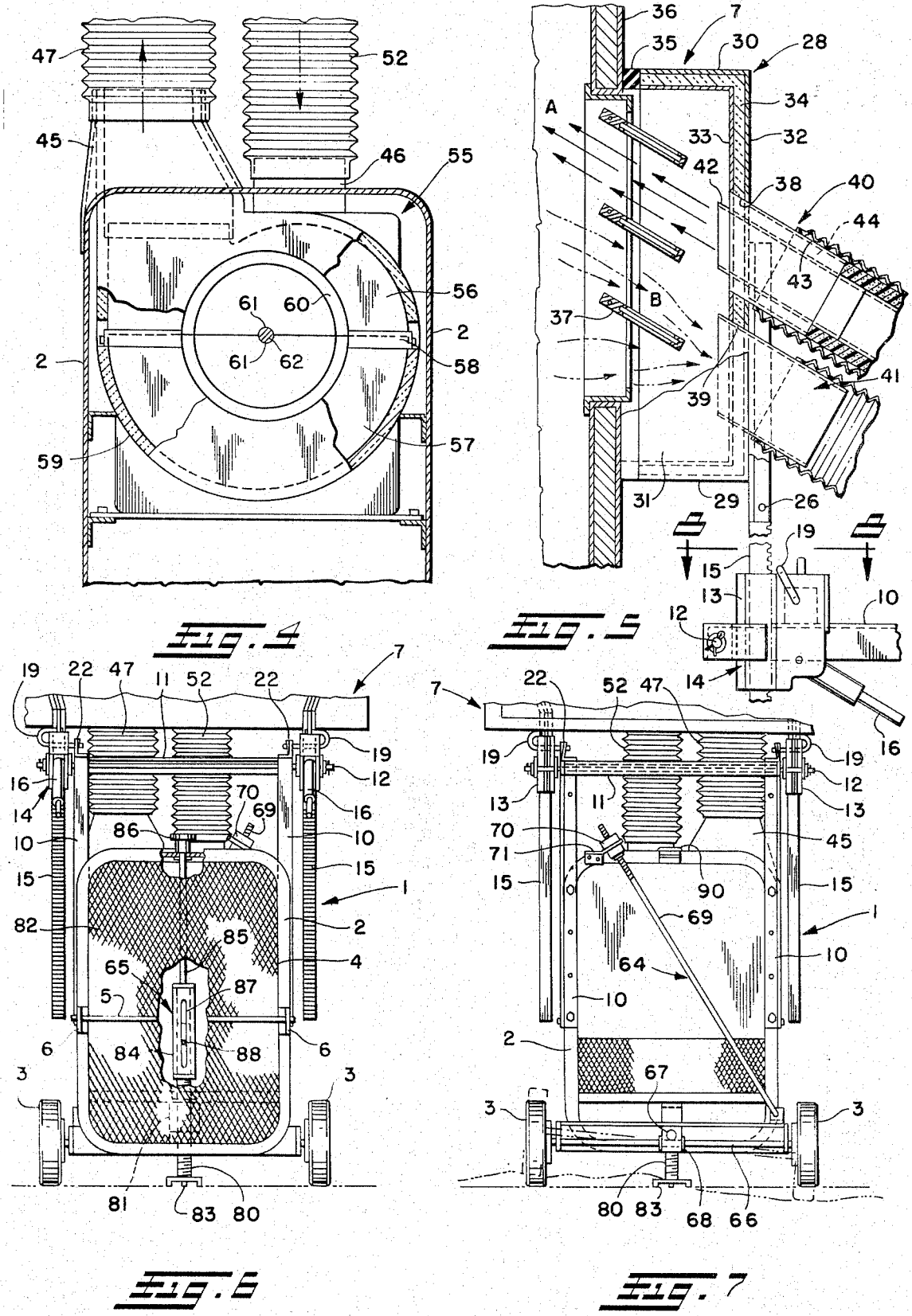

PORTABLE AIR CONDITIONER APPARATUS

The present invention relates generally as indicated to a portable air conditioner apparatus adapted to be used with a variety of different recreational vehicles, such as campers, trailers, and mobile homes.

Recreational vehicles have become increasingly popular for vacation and weekend travel as well as for providing semipermanent residences, and a number of campground or trailer park facilities have been established to handle the various needs of such vehicles on both temporary and permanent bases. The facilities presently provided in such campgrounds are generally limited to providing the basic needs such as electricity and water. Eventually however, othe facilities or services, such as air conditioning for vehicles unequipped with the same may be provided, which is a principal object of this invention. Although air conditioners for cooling vehicles at restaurants or drive-in movie theaters are known, such air conditioning units are not readily adaptable or practical for campgrounds, trailer parks and the like because of the permanent installation required which precludes adjustment of space allotments, reception of different vehicle types, and easy and inexpensive maintenance.

Another principal object of this invention is to provide a portable air conditioner apparatus that is readily adapted to a variety of recreational vehicles having windows of different sizes and types. In general this is accomplished by providing a vertically adjustable head adaptor assembly of sufficient size fully to encase most windows while allowing the same to be opened and closed as desired.

Still another object is to provide a portable air conditioner apparatus that minimizes temperature increase of the cooled air by insulation of the air discharge duct and head adaptor assembly and by the effectuation of a tight seal between such assembly and the side of the vehicle.

Yet another object of the present invention is to provide such a portable air conditioner apparatus with a head adaptor assembly that can readily be converted from an operative elevated position to a relatively compact inoperative position (and vice versa) for storage and relocation. A jack support apparatus may be provided for this purpose permitting the head adaptor to be lowered substantially to the level of the air conditioning unit and then pivoted to an inverted and inoperative position.

Another object of the present invention is to provide leveling mechanisms on the air conditioning unit to permit adjustment of the unit to an inclination similar to that of the vehicle, whereby the head adaptor assembly will properly mate with the vehicle wall for effectuation of a tight seal.

These and other objects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a perspective view of a preferred form of air conditioner apparatus constructed in accordance with the present invention showing the head adaptor assembly in an elevated position sealed about a recreational vehicle window;

FIG. 2 is a perspective view similar to FIG. 1 but showing the head adaptor assembly in its lowered position and pivoted downwardly for easy portability and storage;

FIG. 3 is a fragmentary enlarged perspective view partially in section of the apparatus showing the jack support and air discharge hose detail;

FIG. 4 is an enlarged vertical section through the air conditioning unit taken substantially along line 4—4 of FIG. 2 showing the split blower housing as assembled;

FIG. 5 is an enlarged side elevation view partially in section of the head adaptor assembly shown in operative position as seen from the line 5—5 of FIG. 1;

FIG. 6 is an enlarged fragmentary end elevation view of the apparatus of FIG. 1 as seen from the line 6—6 of FIG. 1 showing the back leveling mechanism;

FIG. 7 is an enlarged fragmentary front end elevation view of the apparatus of FIG. 1 as seen from the line 18—7 of FIG. 1 showing the front leveling mechanism;

FIG. 8 is a fragmentary transverse section through the jack assembly of FIG. 5, taken substantially along line 8—8 of FIG. 5 to show the position of the head adaptor assembly lock mechanism when elevated; and FIG. 9 is a fragmentary transverse section through the jack assembly of FIG. 2, taken substantially along line 9—9 of FIG. 2 to show the position of the head adaptor assembly lock mechanism after lowering and pivoting downwardly tee head adaptor assembly.

DESCRIPTION OF THE PREFERRED EMBODIMENT

Referring now in more detail to the drawings and initially to FIGS. 1-3, the portable air conditioner apparatus of the present invention is generally indicated at 1 and includes a conventional air refrigerating system (not shown) enclosed in a housing 2 which in turn is mounted upon a pair of front wheels 3. The back panel 4 of frame 2 is provided with a horizontally extending bar 5 supported by suitable brackets 6 attached to the back panel by which the back of the unit may be lifted from a supported position for easy movement on the front wheels 3. A head adaptor assembly 7 is supported from the front end of frame 2 on a vertical adjustment mechanism indicated generally at 8. Such vertical adjustment mechanism 8 includes a pair of laterally spaced vertically extending L-shaped support members 10 (see FIG. 3) connected along their vertical legs to the front end of housing 2 adjacent the sides thereof. a horizontal beam 11 is connected to the ends of the horizontal legs of L-shape supports 10 for supporting a rod 12 whose ends project outwardly beyond the L-shape supports 10 for pivotally supporting the panel housings 13 of conventional rack and lever jacks 14. Vertical racks 15 cooperatively pass through the hollow pawl housings 13 and may be moved either upwardly or downwardly by proper biasing of the pawl and subsequent operation of the jack levers 16.

As best seen in FIGS. 1 and 3, the head adaptor assembly 7 is attached to one end of the vertical racks 15 for movement therewith as by means of T-brace members 17 welded to the vertical racks at an angle and riveted to the back side of the head adaptor assembly along the length of the members 17. The pivotal connection of the jacks 14 on the ends of the rod 12 permits the head adaptor assembly 7 to be pivoted from the operative FIG. 1 position to the stored position shown in FIG. 2, and by fully lowering racks 15 and pivoting the supported head adaptor assembly 7 to its stored position, as shown in FIG. 2, the portable air conditioner apparatus 1 is relatively compact for easy movement and storage.

To prevent pivotal movement of the jacks 14 and head adaptor assembly 7 when in the upright raised position, there is provided a pair of lock mechanisms 18 each desirably consisting of a generally U-shape element 19 having one leg 20 received in an opening 21 in each jack housing 13 and urged toward a fixed plate 22 on each of the support members 10 by a spring 23 for receipt in an opening 24 therein. As apparent, when the leg 20 is received in the opening 24 in the fixed plate 22 as shown in FIGS. 5 and 8, the jacks 14 and head adaptor assembly 7 are locked against downward pivotal movement.

To pivot the head adaptor assembly 7 to the stored position shown in FIG. 2 merely requires lowering the head adaptor assembly by operation of the jacks 14 and withdrawing the lock elements 19 from the openings 24 in the fixed plates 22. However, before the head adaptor assembly is actually pivoted downwardly to the stored position shown in FIG. 2, the other legs 25 of the lock elements 19 are desirably inserted into openings 26 in the upper ends of the vertical racks 15 to prevent the vertical racks from moving relative to the jack housings 13 after pivoting to keep the head adaptor assembly from falling into engagement with the ground as shown in FIGS. 2 and 9.

Referring further to FIG. 5, the head adaptor assembly 7 includes an outer pan-shaped housing 28 having bottom wall 29, top wall 30, side walls 31 and back wall 32. An inner liner 33 of similar shape but with reduced dimensions is concentrically positioned within the outer housing. The space between the inner liner 33 and outer housing is filled with polyurethane sprayed insulation 34 thermally to insulate the assembly. A resilient gasket 35 of latex rubber or other suitable material extends entirely about the open end of the housing to provide a seal between the contacted side 36 of the vehicle and such housing when the adaptor assembly is moved into the operative position illustrated. Such gasket also permits certain adjustments to be made to the relative positions of the head adapter assembly and air conditioning unit without marring or otherwise damaging the side of the recreational vehicle. It will be seen from FIG. 5 that the pan-shaped housing 28 is desirably sufficiently deep to allow a jalousie window 37 or the like to be opened outwardly into the housing while in operative position.

Two diagonally spaced and slightly inclined apertures 38, 39 are provided in the back wall 32, insulation 34 and inner liner 33, as best shown in FIGS. 1, 3 and 5. The aperture 38 is a cool air discharge aperture and is positioned above aperture 39 which is the air withdrawal or return aperture. Hose mounting stubs 40 and 41 may be inserted through such apertures 38, 39 and welded to the outer face of back wall 32.

The cool air discharge mounting stub 40 has an inner cylindrical member 42 extending inside the housing and a concentric outer cylindrical member 43. The inner cylindrical member 42 is positioned within member 43 by peripherally spaced support elements (not shown), providing an air gap 44 therebetween which acts to insulate inner member 42. Return stub 41 may be an uninsulated cylindrical member which at its inner end extends within liner 33 and at its outer end projects well beyond back wall 32.

Flexible hoses or tubes 47 and 52 are connected between the mounting stubs 40 and 41 and the discharge and return ports 45 and 46, respectively, of the air conditioning unit. Both of such hoses may be made of flexible plastic material reinforced by fiber glass impregnation and spiral wires. The cool air discharge hose 47 consists of two flexible tubes 49 and 50, as best shown in FIG. 3. The inside tube 49 is of the same diameter as inner member 42 of mounting stub 40 and is concentrically positioned within outer hose 50 by peripherally located spacer elements 51, the trapped air between such hoses acting to insulate the cool air flow through inside tube 49 from atmospheric conditions. The spacer elements 51 may be made of polyethylene sponge or other suitable material and keep the inner hose 49 substantially centered within the outer hose 50 even when the hoses are bent. Inside tube 49 is smaller in diameter than air return hose 52 which results in relatively faster air velocity for the cool air. As an example, the cool air discharge tube 49 may be a 4 inch tube (I.D.) with a 6 inch I.D. tube 50 surrounding the same, whereas the air return hose 52 may have an inner diameter of approximately six inches. As shown, the hoses are of sufficient length to permit the head adaptor assembly to be either pivoted to its stored position or fully elevated, and such hoses are connected to the mounting stubs by fitting the ends thereof around such stubs. Conventional clamping devices or adhesives (not shown) may be used to secure such hoses in place.

Referring now to FIG. 4, the cool air flow through hose 47 is generated by a conventional squirrel cage blower which is encased in an insulated split housing 55. Such housing includes an upper housing section 56 and a lower housing section 57, the former having a bottom lip 58 of slightly increased dimension that fits over the upper portion of the lower housing half. Fastening means 59 are passed through apertures in lip 58 to engage lower section 57, thereby to secure the two halves of the housing in assembled relationship. The lower housing half 57 is mounted on evaporator and condenser housing 59 to support the assembled housing within frame 2. The two halves 56, 57 are formed with complemental recesses 60 for the blower wheel choke ring and with complemental semi-circular apertures 61 for the motor output shaft 62. Such a two piece blower housing 55 facilitates manufacturing assembly of the air conditioning unit and also field maintenance of the blower motor.

The air conditioner body frame or housing 2 is provided with front and back leveling mechanisms 64 and 65 so that the apparatus 1 may be properly positioned with respect to any recreational vehicle. The front mechanism 64, as best shown in FIG. 7, is directly connected at its lower end to front axle 66 adjacent one of the wheels 3. Such axle may be mounted to frame 2 by a downwardly depending bearing block 67 having a spherical bearing 68 therein which permits such axle to be pivoted in a vertical plane about such block.

The front mechanism 64 includes an elongated tie rod 69 pivotally connected at one end to the axle 66 and threaded at the other end for threaded engagement by a rotatable nut 70 retained against axial movement by a suitable mounting bracket 71 fastened to the housing 2. The tie rod 69 and nut 70 thus form a link between the housing 2 and axle 66 of adjustable length. By rotation of the nut 70, the length of the link may be varied which in turn changes the angular position of the axle 66. Such changes in the angular position of the axle are made to compensate for variations in terrain as illustrated in phantom lines in FIG. 7.

The back leveling mechanism 65 as best shown in FIG. 6 includes a threaded rod 80 threadedly received in a tapped bore in a block 81 attached to the body frame 2 inwardly of a wire screen 82 attached to the rear of the frame. The bottom of rod 80 is provided with a base plate 83 which acts as a support for the rear end of the air conditioner frame or housing 2. The top end of the rod 80 is received in a tubular member 84 rotatably suspended from the top of the housing by a rod 85 having an exposed knob 86 on the upper end thereof. The tubular member 84 has a longitudinal slot 87 in one side thereof and the upper end of the rod 80 has a pin 88 extending laterally therefrom through the slot 87, whereby turning of the knob 86 by hand will cause axial movement of the rod 80 and base plate 83 relative to the tubular member 84 and housing 2 to vary the relative position of the back of the housing.

A mercury tilt switch 90 (see FIG. 7) may also be positioned on the front of the housing 2 to shut off power to the air conditioner in the event that the housing 2 should accidentally tip over or be disposed at too severe an angle.

In use, the portable air conditioner apparatus 1 of the present invention is rolled in its compact storage position to the campsite where air conditioning is desired. The head adaptor assembly 7 will initially be pivoted into its operative position and then vertically aligned with the window in the recreational vehicle. During the pivoting of the head adaptor assembly 7 from the stored position of FIG. 2 to the operative position, the ends of the legs 20 of the lock elements 19 will be cammed outwardly by the cam surfaces 91 on the fixed plates 22 and guided by such cam surfaces into engagement with the openings 24 in such fixed plates for locking the jacks 14 and head adaptor assembly 7 in the vertical upright position. Of course, before the head adaptor assembly 7 can be raised relative to the jack housings 13, the lock elements 19 must be retracted slightly to withdraw the other legs 25 from the openings 26 in the vertical racks 15 and pivoted out of alignment therewith as shown in FIGS. 5 and 8. The relative vertical orientations of the adaptor head assembly and vehicle side may then be observed to determine if adjustment of unit position is necessary to provide for effectuation of a proper seal. If necessary, such adjustment may be implemented by pivotal adjustment of the wheel axle 66 and/or by vertical adjustment of the rear base plate 83 relative to housing 2. When proper orientation has been achieved, the housing 2 may be pushed inwardly to move gasket 35 around the head adaptor assembly 7 into sealing contact with the side of the vehicle about window 37. The air conditioning unit may then be energized to supply cool air to the vehicle, as indicated by arrows A, while simultaneously removing relatively warmer air, as indicated by arrows B (see FIG. 5).

From the foregoing, it will now be apparent that the air conditioner apparatus of the present invention readily adapts itself for use in providing air conditioning for a variety of recreational vehicles and the like, and is of a compact design which permits ready storage or transport of the apparatus from one site to another as desired.

The embodiments of the invention in which an exclusive property or privilege is claimed are defined as follows:

1. A portable air conditioner apparatus for use with recreational vehicles or the like comprising an air conditioning unit having a cool air discharge port and a return port, a vertically adjustable head adaptor assembly having a pan shape housing, flexible air ducts connecting said cool air discharge port and return port to said housing, said head adaptor assembly being vertically adjustable relative to said air conditioning unit to position said pan shape housing sealingly against the side of a vehicle about an opening therein, whereby cool air may selectively be delivered to the vehicle through the air duct connected to said cool air discharge port and relatively warmer air removed from the same through the air duct connected to said air return port.

2. The apparatus of claim 1 wherein said head adaptor assembly is mounted by jack support means to said air conditioning unit for controlled vertical adjustment relative to said unit.

3. The apparatus of claim 1 wherein said air conditioning unit is mounted on front wheels, and leveling means are provided to position said unit and supported head adaptor assembly at an inclination similar to that of a vehicle, whereby said apparatus may readily be moved from one vehicle to another and positioned so that said head adaptor assembly may cooperatively mate with the similarly inclined vehicle side for effectuation of a tight seal.

4. The apparatus of claim 3 wherein said leveling means includes a leveling apparatus connected to the back of said unit, said leveling apparatus comprising a threaded rod threadably connected to said unit for selective vertical movement relative thereto and a base plate connected to the bottom of said rod to support the back of said unit at a position correlative to the relative position of said rod.

5. The apparatus of claim 4 wherein said leveling apparatus further comprises a tubular member for receipt of the upper end of said threaded rod, a longitudinal slot in the side of said tubular member, a pin extending laterally from the upper end of said threaded rod through said slot, and means for rotating said tubular member to cause axial movement of said threaded rod relative to said tubular member.

6. The apparatus of claim 5 wherein said means for rotating said tubular member comprises a second rod suspended from the top of said unit, and an exposed knob on the upper end of said second rod for rotating said second rod.

7. The apparatus of claim 4 wherein said front wheels are mounted to a pivotal axle and said leveling means further includes a second leveling apparatus connected to the front of said unit, said second leveling apparatus comprising a link of adjustable length with the bottom of said link being connected to said axle, whereby adjustment of the link length results in pivotal movement of said axle.

8. The apparatus of claim 1 wherein said pan-shaped housing has a gasket extending around the entire periphery of the open end thereof to effect a seal with the vehicle side, said housing being sufficiently deep to receive windows and the like that open outwardly from the vehicle.

9. The apparatus of claim 1 wherein said panshaped housing has inlet and outlet apertures in the base wall thereof with outwardly extending hose mounting stubs about said apertures, said pan-shaped housing and inlet mounting stub being insulated to minimize heat gain in the cool air from said unit.

10. The apparatus of claim 1 wherein said duct for cool air between said cool air discharge port and housing inlet aperture is insulated by placing a second concentric duct about the first duct, such concentric relationship being maintained by peripherally located spacer elements between said ducts.

11. The apparatus of claim 1 wherein said head adaptor assembly is mounted for pivotal movement between an upright operative position and a collapsed lower inoperative position.

12. The apparatus of claim 11 wherein said head adaptor assembly is mounted by jack support means to said air conditioning unit for controlled vertical adjustment relative to said unit, and means are provided for pivoting said jack support means and thus said head adaptor assembly to said unit for pivotal movement between such upright operative position and lower inoperative position.

13. The apparatus of claim 12 further comprising means for releasably locking said jack support means and thus said head adaptor assembly in such upright operative position.

14. The apparatus of claim 13 wherein said last-mentioned means comprises a fixed plate on said unit having an opening therein, and an axially movable lock element on said jack support means axially movable into and out of engagement with said opening in said fixed plate.

15. The apparatus of claim 14 further comprising means for preventing movement of said head adaptor assembly relative to said jack support means when in the lower inoperative position.

16. The apparatus of claim 1 wherein said air conditioning unit includes a blower motor encased in an insulated split housing to facilitate assembly of said unit and field maintenance of said motor.

* * * * *